(No Model.) 2 Sheets—Sheet 1.
D. Z. CRAVER.
MACHINE FOR CUTTING CHEROOTS.
No. 437,853. Patented Oct. 7, 1890.
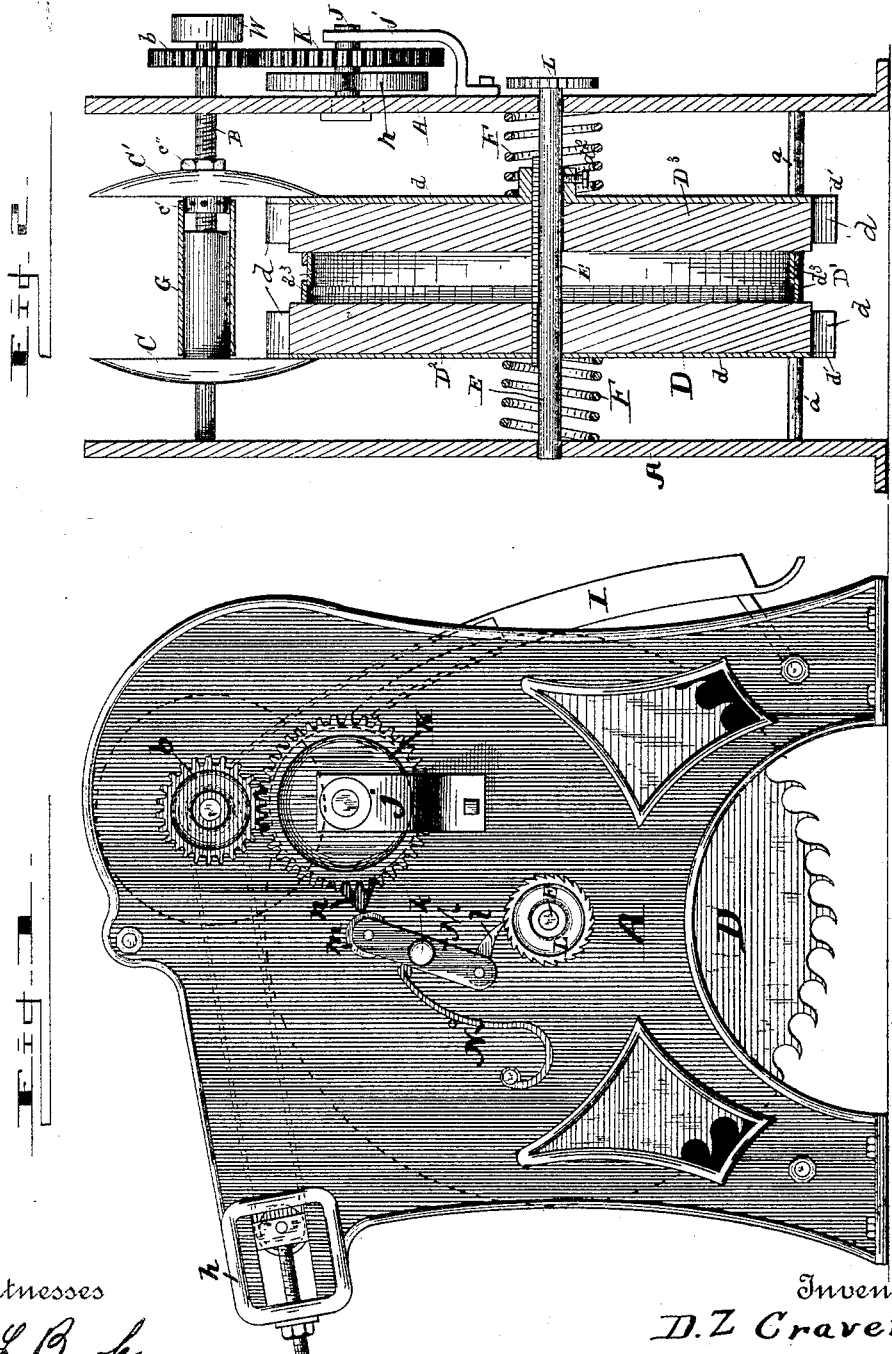
Witnesses
P. L. Brooks
Arthur E. Sowell
Inventor
D. Z. Craver.
By his Attorney
Frank C. Anderson.

(No Model.) 2 Sheets—Sheet 2.
D. Z. CRAVER.
MACHINE FOR CUTTING CHEROOTS.
No. 437,853. Patented Oct. 7, 1890.
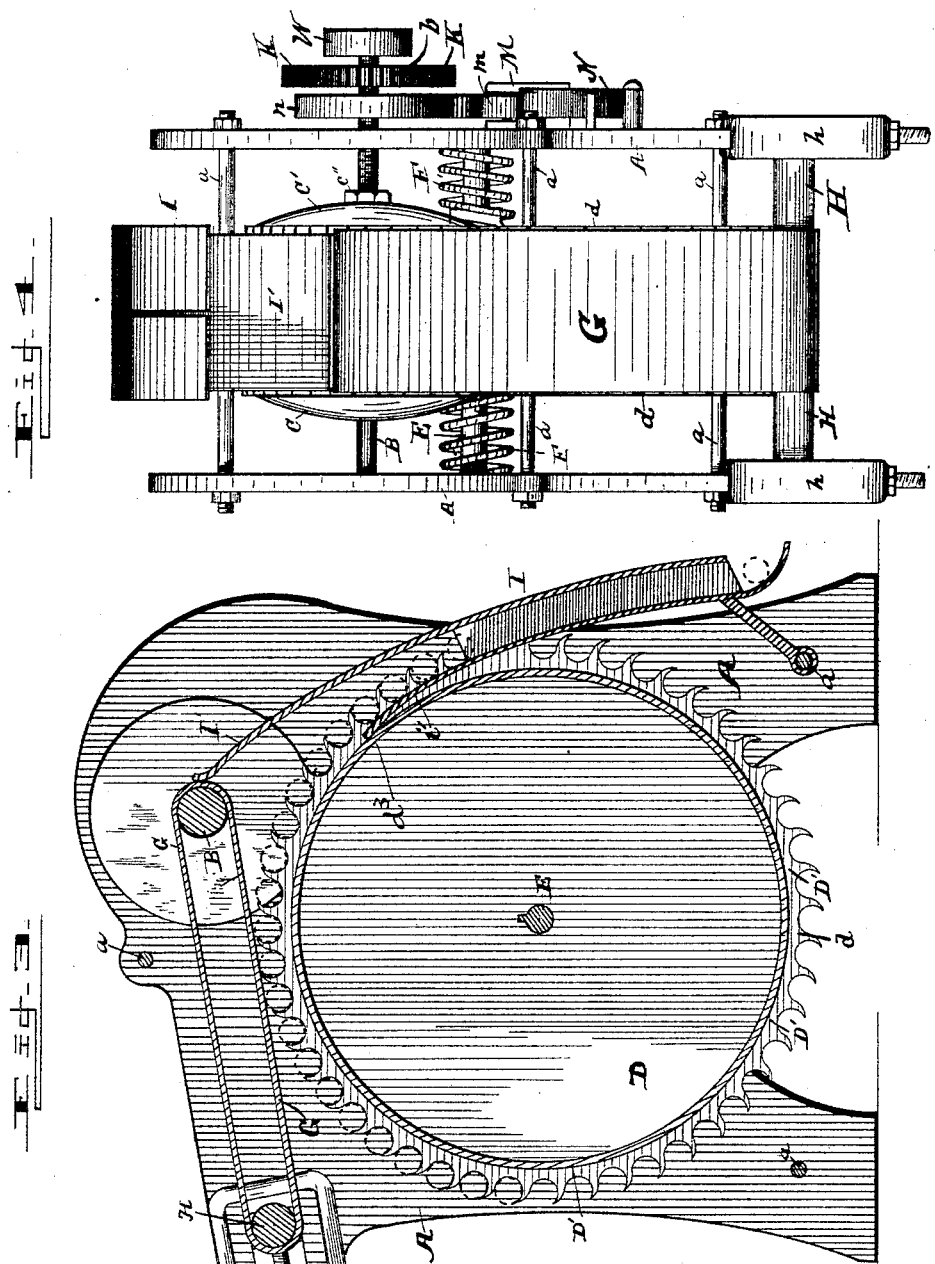
WITNESSES:
P. L. Brooks.
Arthur E. Dowell
INVENTOR
D. Z. Craver.
BY Frank E. Anders
his ATTORNEY.

UNITED STATES PATENT OFFICE.

DAVID Z. CRAVER, OF RICHMOND, VIRGINIA.

MACHINE FOR CUTTING CHEROOTS.

SPECIFICATION forming part of Letters Patent No. 437,853, dated October 7, 1890.

Application filed May 20, 1890. Serial No. 352,441. (No model.)

*To all whom it may concern:*

Be it known that I, DAVID Z. CRAVER, a citizen of the United States, residing at Richmond, in the county of Henrico and State of Virginia, have invented certain new and useful Improvements in Machines for Cutting Cheroots, &c.; and I do hereby declare the following to be a full, clear, and exact description of the invention, such as will enable others skilled in the art to which it appertains to make and use the same.

This invention is an improved machine for cutting cheroots, cigarettes, &c., into proper lengths; and it consists in the novel construction and arrangement of parts hereinafter clearly described and claimed.

Reference being had to the accompanying drawings by letters, Figure 1 is a side elevation of my improved machine for cutting cheroots, cigarettes, &c., to proper length. Fig. 2 is a vertical transverse sectional view through the same. Fig. 3 is a central vertical longitudinal section thereof. Fig. 4 is a top plan view.

A A designate the two upright side pieces of the frame of the machine, which are united by transverse pieces or rods $a$ $a$ and suitably braced or stayed, and they can be securely bolted to the support or foundation whereon the machine is placed.

B designates a revoluble shaft journaled in proper bearings in pieces A A and lying transversely of and at top of the machine. C C' designate two circular disks mounted on said shaft near the opposite sides of the frame, and having their peripheries beveled to form cutting or shearing edges. Disk C is fixed on the shaft; but disk C' is adjustably confined thereon between nuts $c'$ and $c''$, engaging threads on the shaft and clamping disk C' between them. Nut $c'$ is cylindrical, but has holes in its periphery by which it can be turned with a pointed tool.

D designates the feeding-drum mounted on a transverse shaft E, journaled in the main frame below shaft B, and this drum is preferably of large diameter, and it has two peripheral flanges $d$ $d$ at its opposite edges, leaving an intermediate peripheral groove or channel D'. The flanges $d$ $d$ are notched or toothed, as at $d'$ $d'$, at corresponding opposite points, and in these notches can be laid a cheroot or cigarette. The upper portion of the drum stands between the disks C C', and the latter runs closely against the sides of the drum, which is metal faced on its sides to shear with the cutting-disks and to prevent rapid wear.

The drum is kept in proper position with relation to the disks on shaft E by means of coiled springs F F, slipped on shaft E between the sides of the frame and the drum and bearing against the latter, or flat springs might be employed. Drum D is preferably made in two similar halves, one of which $D^2$ is fixedly keyed on the shaft and adjoins disk C. The other half $D^3$ is splined on the shaft, but is adjustable thereon, being locked after adjustment by screw $d^2$, playing through its offset hub, as shown.

$d^3$ indicates annular flanges on the inner faces of halves $D^2$ $D^3$, which may telescope. By this construction the width of the drum can obviously be regulated according to the relative positions of the disks C C'. The peripheries of disks C C', it will be observed, project below the bottoms of the uppermost notches $d'$ in flanges $d$, so that a cheroot laid in said notches will have its ends sheared off cleanly by the disks.

The drum and disks are revolved in opposite directions, as hereinafter described, so that in feeding the cheroots to the cutting-disks the latter have a draw-cut action, preventing tearing of the wrappers.

In order to hold the cheroots or cigarettes firmly in the notches $d'$ while being sheared, an endless flexible belt G is employed. This belt runs over the shaft B, between disks C C', or a sleeve fixed on and revolved by said shaft, and over a roller H parallel with but slightly below shaft B and above drum D, which roller is mounted in adjustable journal-boxes $h$ $h$, resting in lateral slots in the side pieces of the frame and adjustable by means of set-screws, so that the tension of the belt can be regulated as desired. The lower portion of the belt travels in the same direction and impinges against the upper portion of flanges $d d$, and consequently will assist in drawing the cheroots, &c., to the disks and at the same time prevent their escaping from the notches during the cutting operation.

I designates a delivery-tube into which the cut cheroots are delivered from the drum, to be removed thence as desired. This tube is secured at the end of the machine opposite roller H, and it has a forwardly-projecting curved finger $i'$ at its upper end or mouth, which finger rests in channel D' of drum D, below shaft B, and it has an outer lip I' at its upper end, which overlies and impinges against flanges $d^3\ d^3$. The bottom of this tube extends outwardly and downwardly, and as the cheroots are carried past the cutting-disks by the revolution of the drum they are carried between finger $i'$ and lip I', and the finger forces them out of notches $d'$ and directs them into the tube, as will be apparent from the drawings. The cheroots are slipped into notches $d'$ of the drum by hand, the drum revolving intermittingly, but in one direction only, and that toward the delivery-tube.

J designates a stub-shaft mounted in bearings in one side piece A and in a bracket $j$ attached thereto. K is a pinion on said shaft, meshing with a smaller pinion $b$ on the end of shaft B. W is a driving-pulley on the extremity of shaft B.

L designates a ratchet-wheel fixed on the projecting end of shaft E below shaft J.

M designates a rocking lever mounted and fulcrumed on a stub-shaft $k$, projecting from the side of the frame and having a dog $l$ pivoted to its lower end and engaging ratchet L, while in its upper end is a friction-roller $m$. The upper end of the lever M is pressed toward shaft J by a spring N, and $n$ is a cam on shaft J, which strikes the upper end of lever M during the revolution of shaft J and causes it to rock, throwing its lower end backward, and thereby imparting through the dog and ratchet a backward revolution to the drum. The amount of oscillation of lever M is so regulated that only sufficient movement is imparted to the drum at each impact of the cam $n$ thereagainst to carry one notch $d'$ past the cutters. Thus one cheroot will be carried forward and sheared at each movement of the drum. The attendant should place the cheroots or cigarettes in the notches at the rising side of the drum during the intervals when it is at rest. The machine will operate accurately, correctly, and cleanly cut the cheroots at whatever speed it is driven, which must be regulated by the dexterity of the attendant in filling the notches of the drum with cheroots.

The cutting-disks can be readily sharpened without removal.

I have shown the shaft J and pinions K $b$ as enabling the cutting-disks to be revolved more rapidly in comparison to the movement of the drum; but the cam $n$ might be mounted on the end of shaft B. Disks C C' being adjustable on shaft B, and the drum being formed in two parts, adjustable toward or from each other, to correspond with the adjustment of the disks, the machine can be readily altered to cut cheroots or cigarettes of various lengths.

Having described my invention, what I claim as new, and desire to secure by Letters Patent thereon, is—

1. The combination of the feed-drum having peripheral notches and a central peripheral groove and the shaft carrying cutting-disks mounted above said drum with the delivery-tube having a stripping-finger resting in the groove of the drum, and an overreaching lip, all constructed and arranged to operate substantially as and for the purpose set forth.

2. The combination of the feed-drum having peripheral notched flanges, the shaft carrying cutting-disks mounted above said drum, the endless belt running between said disks, and the delivery-tube having a stripping-finger, all constructed substantially as described.

3. The combination of the shaft carrying the cheroot-feeding devices, the revoluble shaft carrying cutters, and means for imparting motion to said cutter-carrying shaft with the ratchet, oscillating lever, dog, and cam for intermittingly operating said feeding devices, substantially as described.

4. The combination of the notched feeding-drum, its supporting-shaft and ratchet thereon, and the oscillating spring-controlled lever carrying a dog engaging said ratchet with the revolving shaft carrying cutter-disks, the cam adapted to intermittingly engage and oscillate said lever, and the endless belt running between said disks, all substantially as and for the purpose described.

In testimony whereof I affix my signature in presence of two witnesses.

DAVID Z. CRAVER.

Witnesses:
JULIA R. ANDERSON,
ARTHUR E. DOWELL.